April 20, 1948.                    L. JOFEH                       2,440,200
                RECTIFYING NETWORK FOR MEASURING ALTERNATING CURRENT
                              Filed March 14, 1945
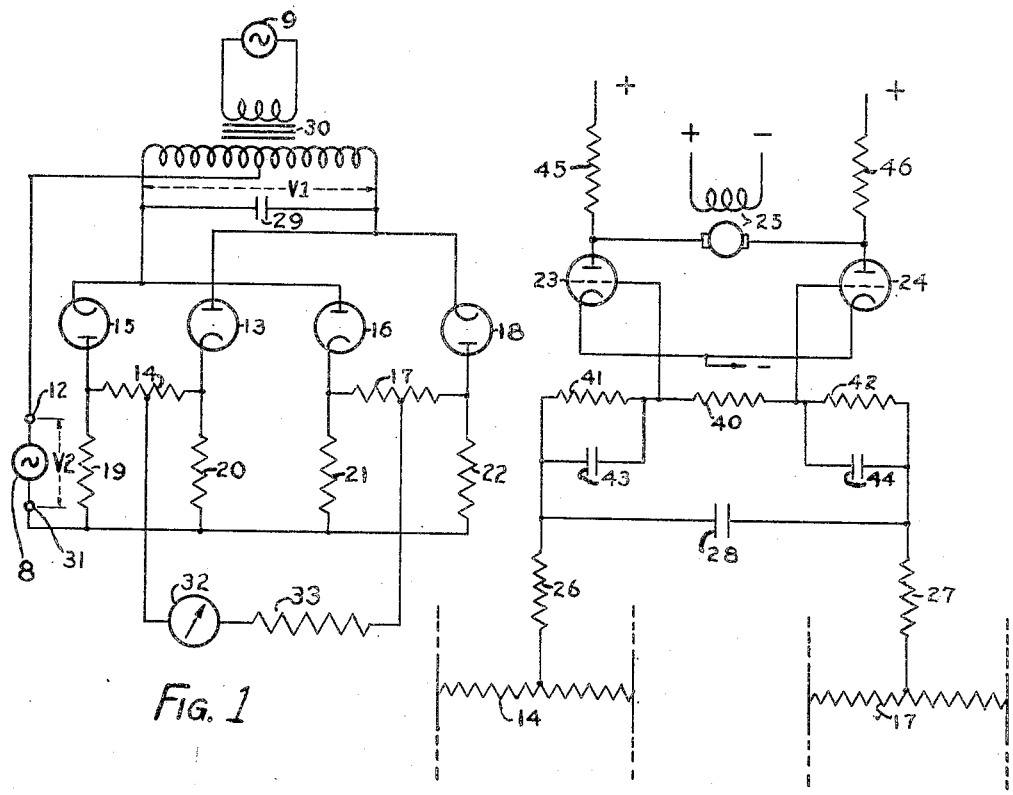
Fig. 1
Fig. 2
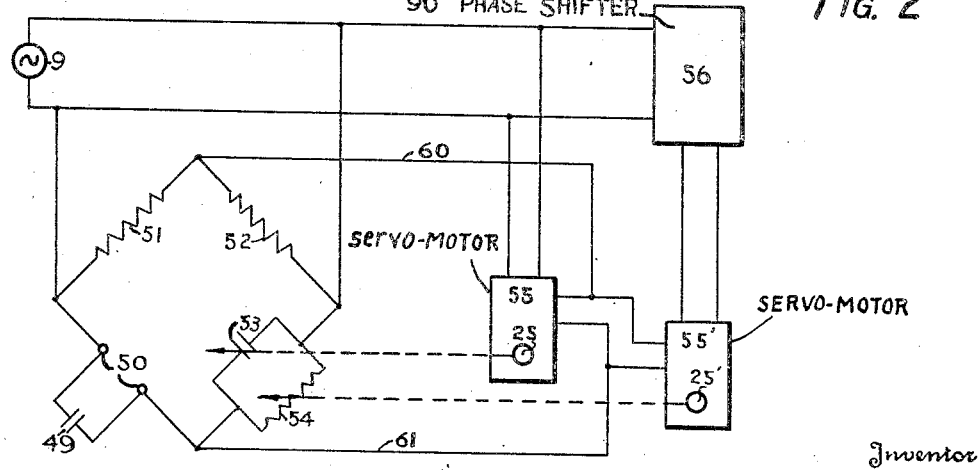
Fig. 3
Inventor
LIONEL JOFEH
By Ralph B. Stewart Patented Apr. 20, 1948

2,440,200

UNITED STATES PATENT OFFICE 2,440,200

RECTIFYING NETWORK FOR MEASURING ALTERNATING CURRENTS

Lionel Jofeh, London, England, assignor to A. C. Cossor Limited, London, England, a British company Application March 14, 1945, Serial No. 582,640
In Great Britain April 6, 1944

6 Claims. (Cl. 171—95)

This invention relates to an electric circuit, the function of which is to produce a direct voltage, the magnitude and sense of which will vary in accordance with the amplitude and sense of that component of an input alternating voltage which has the same frequency as, and is co-phased with, an alternating reference voltage.

This circuit has various applications, but is particularly applicable in measuring circuits such as alternating current bridges. It may be used to operate a servo mechanism for automatic balancing of an alternating current bridge.

In carrying into effect the arrangement according to the invention, one side of the input voltage must be connected to a point having the mid-potential of the reference voltage. If this is not immediately permissible, therefore, one or other of these voltages must be introduced through an A. C. coupling such as a transformer. Either the reference voltage or the input voltage, or both, should be sinusoidal.

Further, in carrying into effect the arrangement according to the invention, a pair of rectifier load resistors, each having rectifiers at both ends, are connected to form parallel but oppositely - conducting paths across the reference voltage. The input voltage is applied between the mid-point of the reference voltage and a common point from which four further resistors are connected to the extremities of the rectifier load resistors. The direct voltage output required is the direct component of the voltage developed between the mid-points of the rectifier load resistors.

If it is required that the direct voltage output shall vary substantially linearly with the amplitude of the co-phased component of the input voltage, it is necessary that this amplitude shall be small relative to that of the reference voltage, and further it is necessary that the rectifiers shall exhibit small resistance, in their conductive direction, relative to the rectifier load resistors.

In the accompanying drawing, Figure 1 is a diagram of a circuit arrangement embodying the invention; Figure 2 is a diagram of an extension of the circuit of Figure 1 to provide for the operation of a servo-motor to adjust a control which will vary substantially linearly the co-phased component of the input voltage; and Figure 3 is a diagram of a self-balancing alternating current bridge circuit for automatic measurement of the capacity and resistance of a condenser.

In the circuit shown in Figure 1, a source 9 of alternating reference voltage, which may, for example, be a 50-cycle main, is connected across the primary of a transformer 30. A condenser 29, connected across the secondary, is of such value as to bring the secondary voltage V1 into phase with that of source 9.

The source 8 of the input alternating voltage V2 is connected between terminals 12, 31. Terminal 12 is connected to a centre tap on the secondary of transformer 30.

Across the extremities of the secondary of transformer 30, two unidirectionally conducting paths are connected. One of these comprises diode 13, diode load resistor 14 and diode 15. The other, connected in the reverse direction, comprises diode 16, diode load resistor 17 and diode 18.

Terminal 31 of input voltage source 8 is a common point connected through four substantially equal resistors 19, 20, 21 and 22, to the four extremities of the two resistors 14 and 17.

The direct voltage output is developed between the mid-points of diode load resistors 14 and 17 and is directly measured by a D. C. microammeter 32 in series with a high resistance 33 between these points.

If it is required that the magnitude of the direct voltage output shall vary substantially linearly with the amplitude of the co-phased component of the input alternating voltage V2, then it is necessary:

(a) That the amplitude of the reference voltage across the whole of the secondary of transformer 30 shall always be at least twice the amplitude of the co-phased component of the input alternating voltage V2, and (b) That the values of diode load resistors 14 and 17 shall each be at least of the order of twenty times the resistances of each of the diodes 13, 15, 16, 18, when conducting.

Diode load resistors 14 and 17 may conveniently each have value ½ megohm, while resistors 19, 20, 21, 22, may each be 2 megohms.

The loadings applied by the circuit to the sources 8 and 9 can be adjusted independently to suit the nature of these sources in any particular application. Assuming equality of resistors 14 and 17, and equality of resistors 19, 20, 21, 22, and zero load between the mid-points of resistors 14 and 17, the effective load on the secondary of transformer 30 has the value of resistor 14 in parallel with the path through series-connected resistors 19 and 20. The effective load on source 8 has the value of (½ resistor 19+¼ resistor 14).

In the circuit shown in Figure 2, the voltage developed between the mid-points of resistors 14 and 17 (which correspond with the same resistors in Figure 1) is applied through a filter network to produce a push-pull direct voltage between the control grid of valves 23 and 24. These valves are provided with anode resistors 45, 46, and the armature of motor 25 is directly connected between their anodes. The field of motor 25 is excited from a D. C. source.

The motor 25 operates a control (not shown) which will vary the amplitude of the co-phased component of the input alternating voltage V2. The control will be arranged to operate in the sense to reduce any co-phased component present in the input voltage. In order to avoid oscillation, the system of "first derivative control" is applied; that is to say, to a voltage representing the error in setting of the control there is added a voltage which approximately represents the rate of change of this error with respect to time.

Resistors 26 and 27, in conjunction with condenser 28, serve to filter out alternating components of the voltage output developed between the mid-points of resistors 14 and 17. The remaining direct voltage output, which appears across condenser 28, is applied across a network comprising resistors 40, 41, 42 and condensers 43, 44. The voltage developed across resistor 40, which is applied between the grids of valves 23 and 24, contains a component proportional to the rate of change of the direct voltage across condenser 28, and thereby provides this "first derivative" control.

The following values of elements may, for example, be employed in this circuit:

| | | |
|---|---|---|
| Resistor 40 | megohms | 1.5 |
| Resistors 41 and 42 | do | 4.0 |
| Condensers 43 and 44 | microfarads | 0.25 |
| Resistors 26 and 27 | megohms | 0.5 |
| Condenser 28 | microfarads | 0.1 |

If motor 25 requires more power than can be developed from this circuit, further stages of amplification may be interposed between the output of valves 23 and 24 and the motor input.

The following features will be noted in the circuit which has been described:

(1) When voltage V2 has components which are not in phase with voltage V1, whether or not they are of the same frequency, they produce no mean changes in the voltages between either of the mid-points of resistors 14 and 17 and terminal 31, and therefore they do not unbalance the valves.

(2) If voltage V1 is greater than the co-phased component (if any) of voltage V2, then variations of voltage V1 have no effect on the state of balance or unbalance of the valves.

(3) When voltage V2 is zero, there is zero voltage, both alternating and direct, between the mid-points of resistors 14 and 17, and also between each of these mid-points and terminal 31. Under this condition, therefore, the filter network 26, 27, 28 does not have to smooth any ripple voltages arising from voltage source V1.

In the bridge circuit shown in Figure 3, the condenser 49 to be measured is connected between terminals 50. The bridge is completed by ratio arms comprising resistors 51 and 52 and a fourth arm comprising variable condenser 53 and variable resistance 54.

The bridge is energized from an alternating voltage source 9, which may be a 50-cycle main. A circuit 55, exactly similar to the combination of the circuits of Figures 1 and 2, receives its reference voltage directly from this source. The input alternating voltage to this circuit 55 is derived through leads 60, 61 from the "galvanometer" terminals of the bridge. The motor 25 is coupled through reduction gearing to the control of variable condenser 53.

A circuit 55', identical with circuit 55, receives its reference voltage from source 9 through a quadrature phase-shifting network 56. This circuit 55' receives the same input voltage from the "galvanometer" terminals of the bridge as does the circuit 55. The motor 25' of circuit 55 is coupled through reduction gearing to the control of variable resistance 54. With this circuit arrangement, the controls of condenser 53 and resistance 54 will be automatically varied by motors 25 and 25' until the bridge is correctly balanced.

The following values of elements may, for example, be employed in the circuit of Figure 3, for measuring a condenser 49 of value up to 0.1 microfarad:

| | | |
|---|---|---|
| Resistor 51 | kilohms | 100 |
| Resistor 52 | do | 1 |
| Resistor 54 (maximum) | megohms | 2 |
| Condenser 53 (maximum) | microfarads | 0.001 |

I claim:

1. For the purpose described, the combination of a source of alternating reference voltage, a pair of rectifier load resistors each having rectifiers in series at both ends and being connected to form parallel but oppositely-conducting paths across said source, four further resistors connected respectively from the four ends of said rectifier load resistors to a common point, a source of input alternating voltage having one terminal connected to a point having the mid-potential of said source of reference voltage and having its other terminal connected to said common point, and means responsive to the direct component of the voltage developed between the mid-points of said rectifier load resistors.

2. The combination as claimed in claim 1 wherein said responsive means is a voltage measuring device.

3. A combination as claimed in claim 1 wherein said responsive means comprises a motor energized in accordance with the magnitude and sense of said direct component of voltage developed between the mid-points of said rectifier load resistors, and means operated by said motor for varying that component of said alternating input voltage which is co-phased with said reference voltage.

4. A self-balancing alternating-current bridge circuit comprising at least one variable impedance element, a motor mechanically geared to vary said variable impedance element, a source of alternating reference voltage, a pair of rectifier load resistors each having rectifiers in series at both ends and being connected to form parallel but oppositely-conducting paths across said source, four further resistors connected respectively from the four ends of said rectifier load resistors to a common point, a source of input alternating voltage having one terminal connected to a point having the mid-potential of said source of reference voltage and having its other terminal connected to said common point, and means to energize said motor in accordance with the magnitude and sense of the direct component of voltage developed between the mid-points of said rectifier load resistors.

5. A circuit for deriving a direct current voltage from a source of alternating current control voltage comprising, in combination, a source of alternating current reference voltage, a pair of rectifier load resistors each having rectifiers in series at both ends and being connected to form parallel but oppositely-conducting paths across said source of reference voltage, an input circuit energized by said alternating control voltage and having one terminal thereof connected to a point having the mid-potential of said source of reference voltage, and the other terminal of said input circuit being connected to the ends of said rectifier load resistors by four paths having equal resistance values, and an output circuit for said derived voltage connected to the mid points of said rectifier load resistors.

6. A circuit combination according to claim 5 wherein said reference voltage source has the same frequency and the same phase relation as said control voltage source, and the reference voltage source has a magnitude at least twice the amplitude of the control voltage source.

LIONEL JOFEH.

REFERENCES CITED

The following references are of record in the file of this patent:

UNITED STATES PATENTS

| Number | Name | Date |
| --- | --- | --- |
| 1,929,216 | Pfannenmuller | Oct. 3, 1933 |
| 2,316,008 | Ludbrook | Apr. 6, 1943 |